(12) United States Patent
Szanto et al.

(10) Patent No.: US 11,531,767 B1
(45) Date of Patent: Dec. 20, 2022

(54) STRATEGIC DIGITAL MEDIA ENCRYPTION

(71) Applicant: Superpowered Inc., Austin, TX (US)

(72) Inventors: Gabor Szanto, Kapolnasnyek (HU); Alexander Patrick Vlaskovits, Austin, TX (US)

(73) Assignee: SUPERPOWERED INC., Austin, TX (US)

( * ) Notice: Subject to any disclaimer, the term of this patent is extended or adjusted under 35 U.S.C. 154(b) by 392 days.

(21) Appl. No.: 16/140,264

(22) Filed: Sep. 24, 2018

Related U.S. Application Data

(60) Provisional application No. 62/566,319, filed on Sep. 30, 2017.

(51) Int. Cl.
*G06F 21/00* (2013.01)
*G06F 21/60* (2013.01)
*H04L 9/40* (2022.01)

(52) U.S. Cl.
CPC ........ *G06F 21/602* (2013.01); *H04L 63/0428* (2013.01)

(58) Field of Classification Search
CPC .......................... G06F 21/602; H04L 63/0428
See application file for complete search history.

(56) References Cited

U.S. PATENT DOCUMENTS

| | | | |
|---|---|---|---|
| 2009/0169001 A1* | 7/2009 | Tighe | H04L 9/34 380/217 |
| 2013/0282953 A1* | 10/2013 | Orme | G06F 12/0238 711/102 |
| 2015/0026459 A1* | 1/2015 | Divakar | H04N 21/23476 713/160 |
| 2017/0300713 A1* | 10/2017 | Fan | G06F 21/6227 |

* cited by examiner

*Primary Examiner* — Shewaye Gelagay
*Assistant Examiner* — Michael M Lee
(74) *Attorney, Agent, or Firm* — Cooley LLP

(57) ABSTRACT

A media storage and playback apparatus encrypts header fields and side-information fields within respective packets of a compressed, packetized media file to obfuscate unencrypted payload fields within the packets. After encrypting the header fields and side-information fields, the media storage and playback apparatus stores the encrypted header fields and side-information fields together with the unencrypted payload fields within a nonvolatile storage for later retrieval, decryption and playback.

13 Claims, 3 Drawing Sheets

STRATEGIC DIGITAL MEDIA ENCRYPTION

CROSS REFERENCE TO RELATED APPLICATIONS

This application hereby claims priority to and incorporates by reference U.S. provisional application No. 62/566,319 filed Sep. 30, 2017.

SUMMARY

The disclosure includes a media storage and playback apparatus and method which encrypts header fields and side-information fields within respective packets of a compressed, packetized media file to obfuscate unencrypted payload fields within the packets. after encrypting the header fields and side-information fields. The media storage and playback apparatus/method stores the encrypted header fields and side-information fields together with the unencrypted payload fields within a nonvolatile storage for later retrieval, decryption and playback.

TECHNICAL FIELD

The disclosure herein relates to digital media encryption.

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

In various embodiments presented herein, strategically selected portions of a compressed media file are encrypted to obfuscate the totality of the media data conveyed therein with substantially lower power and processing overhead than required in conventional approaches that encrypt the entire media file. In a number of embodiments, a media storage and playback system is operable in multiple security modes, including at least one high-performance mode that leverages strategic (partial-media-file) encryption to improve system performance (i.e., reduce decryption-induced playback latency, reduce processor loading, reduce power consumption, etc.) and at least one compatibility mode to enable the storage/playback system to render fully encrypted media files. While multi-modal capability is assumed with respect to the various storage/playback systems discussed below, in all cases such systems may operate exclusively in the high-performance mode and thus with strategic encryption.

Figure 1:
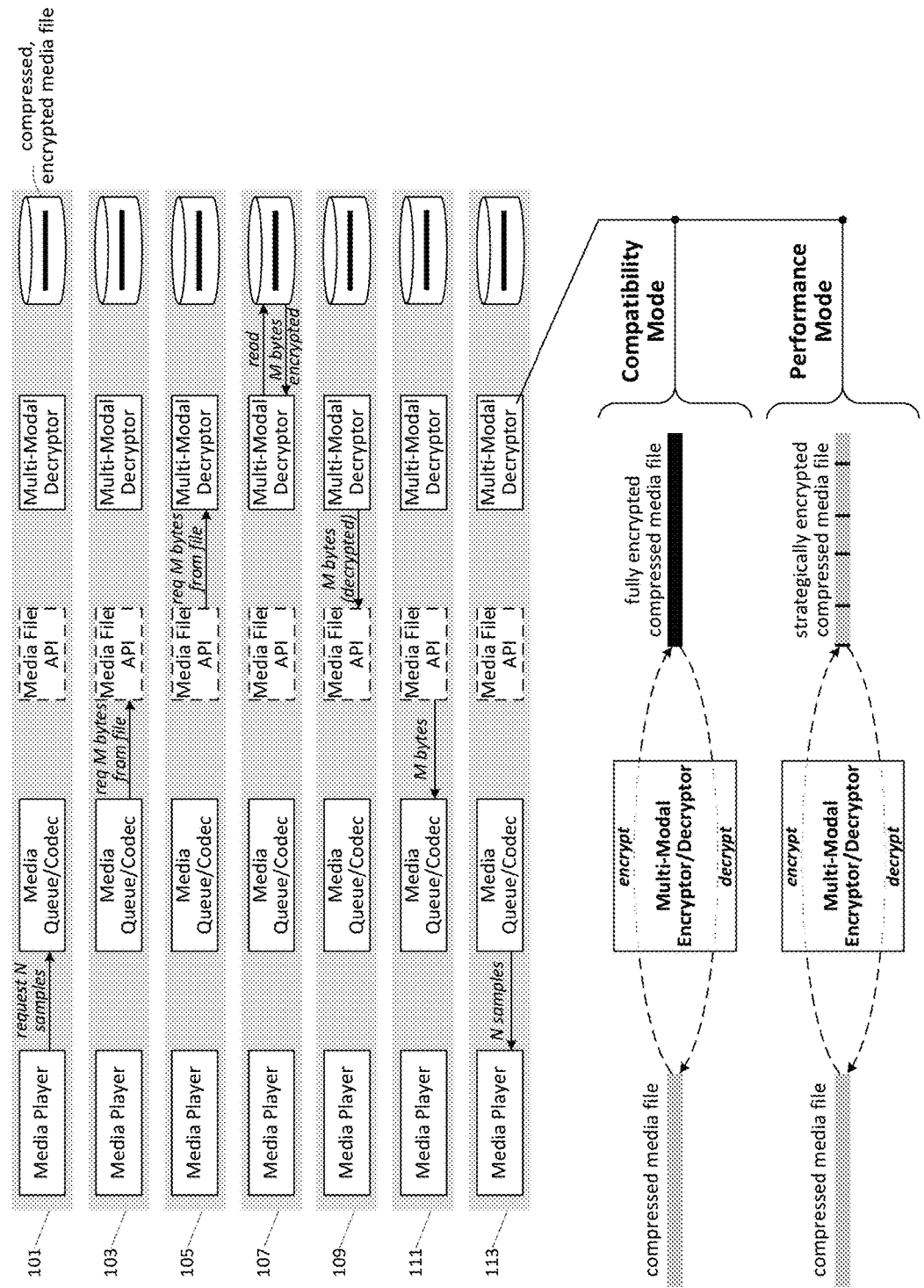
FIG. 1 illustrates an exemplary information flow within a media storage and playback system having multiple media security modes.

FIG. 1 illustrates an exemplary information flow within a media storage and playback system having multiple media security modes. Starting at 101, an audio/visual media player requests N media samples from a media queue/codec, which, in response (103, forwards a request for M media-file bytes to a media file application programming interface (API). At 105, the media file API (e.g., instantiated by a programmed processor) issues a request for M media-file bytes to a multi-modal encryptor/decryptor component. The encryptor/decryptor component issues a read request to a media storage unit (e.g., solid-state or mechanical storage drive, media server, etc.) at 107 and receives M bytes of encrypted media data in response. The encryptor/decryptor decrypts the M bytes of encrypted media data according to one of two media encryption/decryption modes, returning the decrypted media data to the media queue/codec via the media-file API (109 and 111). The media queue/codec formats/decodes the retrieved media data to yield the originally requested media samples, forwarding those samples to the media player at 113 to be rendered in audible/visible form for a system user.

While shown as a unified system, any or all of the components of the media storage/playback system may be remotely located relative to the others. Accordingly, interconnections between system components may be effected through any combination of wired/wireless communication paths, including the Internet or other networked communication paths in which data is relayed between a sequence of network nodes before arriving at a component destination. Also, while uniform-sized information transfers are shown with respect to a number of component inputs and outputs (e.g., M encrypted bytes returned to encryptor/decryptor at 107 and M decrypted bytes forwarded to media-file API at 109), non-uniformly-sized information transfer may occur in all cases, particularly where encryption/decryption alters the volume of overhead information associated with the requested media data. Further, while a media-file API is assumed and provides a virtualization benefit, that component may be omitted in a more specifically tailored implementation, with the media queue/codec interacting directly with the multi-modal encryptor/decryptor. The optional nature of the media-file API is signified in FIG. 1 by the rendering of that component in dashed outline—a convention used generally to emphasize optional components/features/actions in the context of this disclosure. Lack of dashed outline with respect to any given component or action should not be construed as indicating that such component or action is mandatory.

Still referring to FIG. 1, multi-modal encryptor/decryptor may be operated in either of two encryption/decryption modes—a compatibility mode in which a compressed media file is fully encrypted/decrypted, or a performance mode in which only strategically selected portions of the compressed media file are encrypted/decrypted. More specifically, in performance mode, regions of the compressed media file that enable meaningful interpretation and processing of other file content are encrypted while the other file content is left intact, an approach that effectively obfuscates the entire file content through encryption of only a small fraction.

Figure 2:
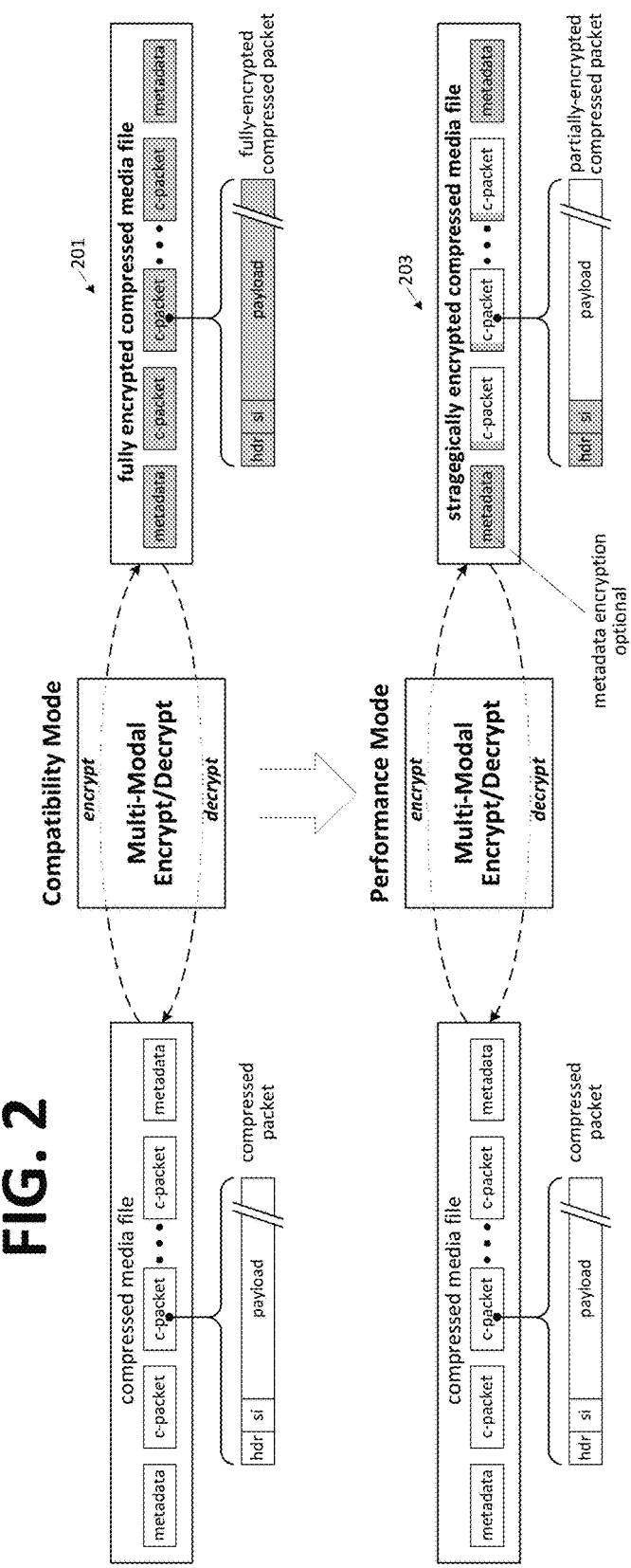
FIG. 2 contrasts the encryption approaches of compatibility and performance security modes in greater detail.
Figure 3:
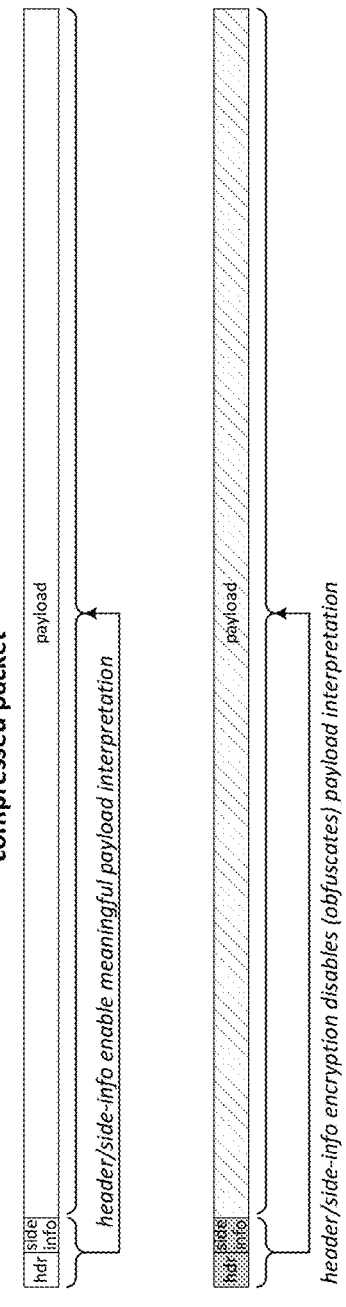
FIG. 3 illustrates an exemplary effect of a partial-encryption approach employed in the performance security mode of FIG. 2.

FIG. 2 contrasts the encryption approaches of the compatibility and performance modes in greater detail. In the example shown, the compressed media file includes a sequence of compressed packets bounded at start and/or end by metadata fields. In compatibility mode, the entirety of the media file content is encrypted (indicated by grey shading) and thus all metadata and all compressed packets (including the component header, side-information and payload fields of each compressed packet) are encrypted to yield a fully-encrypted compressed media file 201. By contrast, in performance mode, the metadata fields are optionally encrypted, and only a relatively small part of each compressed packet—the header and side-information fields—are encrypted, leaving the payload field unencrypted as shown at 203. The effect of this partial-encryption approach is illustrated in FIG. 3. More specifically, because the header and side-information fields of the compressed media packet are needed to meaningfully interpret the payload information, encryption of those two start-of-packet fields disables payload interpretation, rendering the payload data unintelligible (obfuscated). Accordingly, by encrypting only a strategically selected fraction of the compressed packet (i.e., header and side information), the much larger whole of the packet is effectively obscured. Moreover, because the exact byte-locus of encrypted packet regions are non-discernible within the partially encrypted packet, the encryption algorithm (any known or future-developed encryption algorithm may be used) itself is more obscured relative to the wholistic compatibility-mode encryption approach (i.e., unknowable where to apply iterative decryption effort).

Reflecting on FIGS. 2 and 3, processing overhead in both the file encryption and decryption actions (which may be carried out by encryption/decryption components within the same or different host devices) are dramatically reduced through performance-mode encryption as only a relatively small portion of each file need actually be encrypted or decrypted as compared to the whole-file compatibility-mode encryption. In one embodiment, a packet location table is written into the strategically-encrypted compressed media file as the last step of the performance-mode encryption process, after all packets are partially encrypted and all packet locations are stored in memory (i.e., constituting the packet location table). The packet location table is then itself encrypted (optionally) just prior to writing it into the strategically-encrypted compressed media file. In the file decryption path, if the packet location table is encrypted, the performance-mode decryption process begins with decryption of the packet location table.

Figure 4:
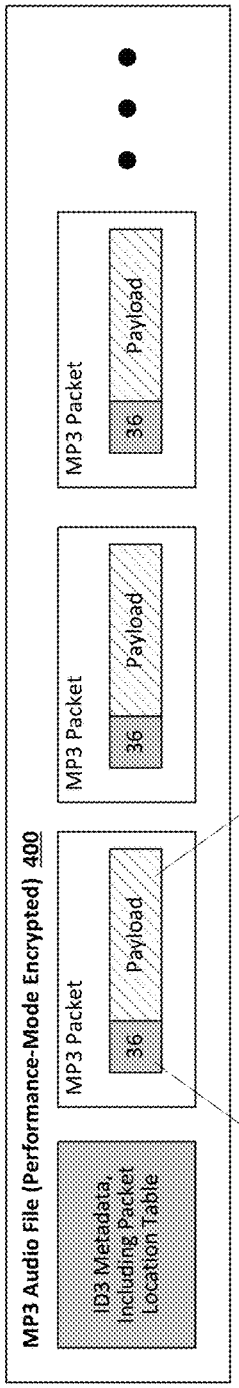
FIGS. 4 and 5 illustrate more detailed examples of the performance-mode encryption approach, depicting strategic encryption of an MP3 audio file and an M4A file, respectively.
Figure 5:
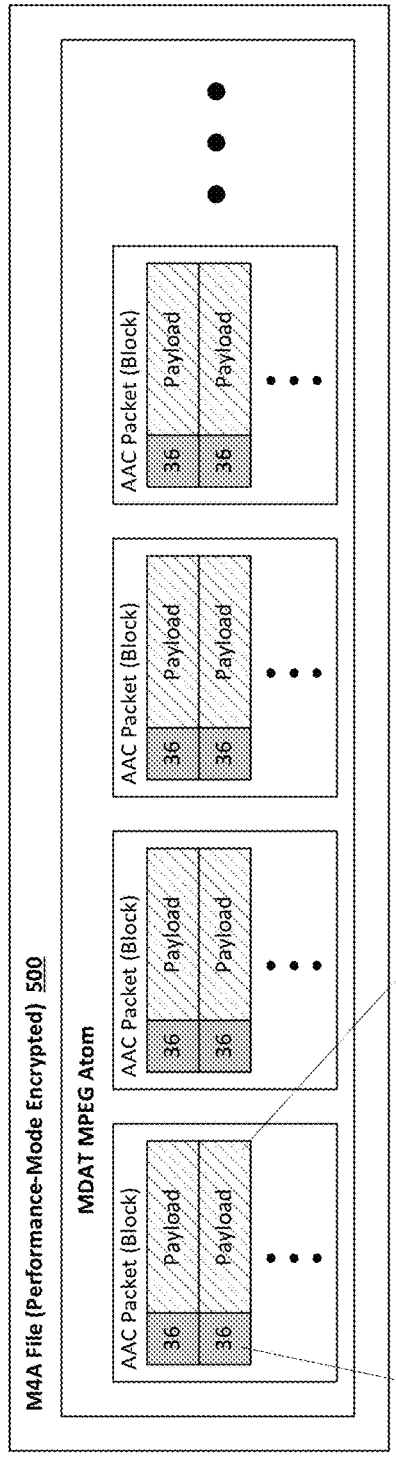

FIGS. 4 and 5 illustrate more detailed examples of the performance-mode encryption approach, depicting strategic encryption of an MP3 audio file 400 and an M4A file 500, respectively. Referring first to FIG. 4, the MP3 metadata field (including packet location table) and header/side-information fields in individual MP3 packets are encrypted (indicated by shading), while the payload is obfuscated (by virtue of the header/side-information encryption—obfuscation indicated by hash-pattern) without incurring encryption overhead. Note that encryption of the metadata field is optional and/or only selected portions of the metadata field may be encrypted. For example, the packet location table may be left in unencrypted form—a choice that reveals the location of encrypted information and packet locations within the file within the file in return for reduced encryption overhead and quick repositioning/seeking to any packet boundary.

In the strategic M4A file encryption shown in FIG. 5, the header/side-information fields within each element of each AAC packet block are encrypted (e.g., 36 bytes encrypted) while the remainder of each element is obfuscated without encryption overhead (i.e., left in unencrypted but unintelligible form effected by the header/side-information encryption). Similar approaches may be implemented with respect to other compressed, packetized media file formats.

Figure 6:
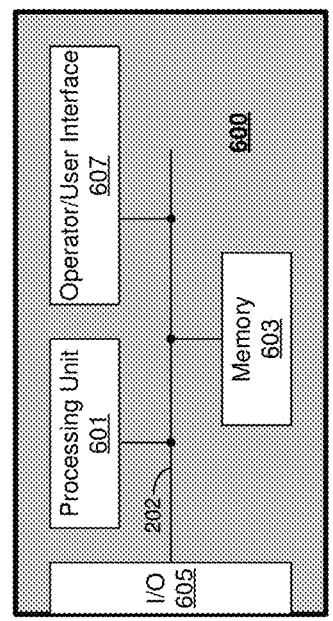
FIG. 6 illustrates a generalized embodiment of a computing element, system or device that may be used to implement any or all of the modules and components of the media file storage/playback system of FIG. 1, including the multi-mode encryptor/decryptor component and its various embodiments/operating modes shown in FIGS. 2-5.

FIG. 6 illustrates a generalized embodiment of a computing element 600, system or device that may be used to implement any or all of the modules and components of the media file storage/playback system of FIG. 1, including the multi-mode encryptor/decryptor component and its various embodiments/operating modes shown in FIGS. 2-5. As shown, computing element 600 includes a processing unit 601 formed by one or more general purposes or special purpose processors, memory 603 for storing program code executed by the processing unit to implement the various components of the above-described embodiments, and also to store the data streamed through the media file storage/playback system (which may include storage of the encrypted media file itself.

Computing element 600 further includes one or more input and/or output (I/O) ports 605 for receiving and outputting media data, and a user interface 607 to present and receive information to a human or artificial operator and thus enable operator control of system operation (e.g., set configuration, programmable values, etc.) as well as to interact with the larger host system in a manner intended by its core function. Note that the user interface may alternatively be implemented through one or more of I/O ports 605. Also, though not shown, numerous other functional blocks may be provided within the computing system according to its core function (and the computing system itself may be a component in a larger host device, appliance or network of devices/appliances). For example, when implemented within a mobile telephone, personal digital assistant, music or video player, etc., the computing system may be accompanied by or incorporate wireless (radio-frequency) communication circuitry, video rendering display and one or more transducers (e.g., microphones, speakers, etc.).

Still referring to FIG. 6, the functional blocks are depicted as being coupled by a communication path 602 which may include any number of shared or dedicated buses or signaling links. More generally, the functional blocks shown may be interconnected in a variety of different architectures and individually be implemented by a variety of different underlying technologies and architectures. With regard to the memory architecture, for example, multiple different classes of storage may be provided within memory 603 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing variable data.

The various methods and techniques disclosed herein may be implemented through execution of one or more a sequences of instructions (i.e., software program(s)) within the processing unit 601, or by a custom-built hardware ASIC (application-specific integrated circuit), or programmed on a programmable hardware device such as an FPGA (field-programmable gate array), or any combination thereof. If a purely hardware-based execution engine is provided, the processing unit 601 and related circuitry may be omitted from computing element 600.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computing system or consumer electronic device or appliance, such as the computing element, system, device or appliance described in reference to FIG. 6.

Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed subject matter. In some instances, the terminology and symbols may imply specific details that may be optional or variable within a given implementation. For example, the term "coupled" is used herein to express a direct connection as well as a connection through one or more intervening circuits or structures. Device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

Also, various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of strategically securing media data using circuitry configured to perform the method, the method comprising:
    encrypting header fields and side-information fields within respective packets of a compressed, packetized media file to obfuscate unencrypted payload fields within the packets to establish partially encrypted packets;
    storing the partially encrypted packets within a nonvolatile storage for later retrieval, decryption and playback, wherein the partially encrypted packets constitute at least a portion of a partially encrypted instance of the compressed, packetized media file;
    generating a packet location table that indicates respective storage locations, within the nonvolatile storage, of the partially encrypted packets;
    encrypting the packet location table; and
    storing the encrypted packet location table within the nonvolatile storage as part of the partially encrypted, compressed, packetized media file, at a beginning of the partially encrypted, compressed, packetized media file such that a decryption process begins with decrypting the encrypted packet location table first.

2. The method of claim 1, further comprising:
    encrypting one or more metadata fields that bound the packets within the compressed, packetized media file; and
    storing the one or more encrypted metadata fields within the nonvolatile storage as part of the partially encrypted compressed, packetized media file.

3. The method of claim 1, further comprising retrieving the partially encrypted, compressed, packetized media file from the nonvolatile storage and executing a playback of the media data within the unencrypted payload fields thereof.

4. The method of claim 1, further comprising:
    retrieving the encrypted packet location table from the nonvolatile storage;
    decrypting the pack location table so as to yield the locations of the encrypted header fields and side-information fields from the nonvolatile storage;
    retrieving the encrypted header fields and side-information fields from the nonvolatile storage;
    retrieving the unencrypted payload fields from the nonvolatile storage;
    decrypting the encrypted header fields and side-information fields to yield decrypted header fields and side-information fields; and
    executing a playback of media data within the unencrypted payload fields based on information within decrypted header fields and side-information fields.

5. The method of claim 4, wherein the executing a playback of media data within the unencrypted payload fields comprises generating at least one of a user-perceptible audio output or a user-perceptible video output.

6. The method of claim 4, wherein the compressed, packetized media file comprises an audio file.

7. A method of strategically securing media data using circuitry configured to perform the method, the method comprising:
    encrypting header fields and side-information fields within respective packets of a compressed, packetized media file to obfuscate unencrypted payload fields within the packets to establish partially encrypted packets;
    storing the partially encrypted packets within a nonvolatile storage for later retrieval, decryption and playback, wherein the partially encrypted packets constitute at least a portion of a partially encrypted instance of the compressed, packetized media file;
    generating a packet location table that indicates respective storage locations, within the nonvolatile storage, of the partially encrypted packets;
    encrypting the packet location table;
    storing the encrypted packet location table within the nonvolatile storage as part of the partially encrypted, compressed, packetized media file, at a beginning of the partially encrypted, compressed, packetized media file such that a decryption process begins with decrypting the encrypted packet location table first;
    retrieving the partially encrypted, compressed, packetized media file from the nonvolatile storage and executing a playback of media data within the unencrypted payload fields thereof, wherein the retrieving comprises: first retrieving and decrypting the encrypted packet location table from the partially encrypted, compressed, packetized media file from the nonvolatile storage to produce a decrypted packet location table, and then retrieving the partially encrypted packets of the packetized media file from the nonvolatile storage based on storage location information provided by the decrypted packet location table.

8. A media storage and playback apparatus comprising a nonvolatile storage and circuitry to:

encrypt header fields and side-information fields within respective packets of a compressed, packetized media file to obfuscate unencrypted payload fields within the packets to establish partially encrypted packets;

store the partially encrypted packets within a nonvolatile storage for later retrieval, decryption and playback, wherein the partially encrypted packets constitute at least a portion of a partially encrypted instance of the compressed, packetized media file;

generate a packet location table that indicates respective storage locations, within the nonvolatile storage, of the partially encrypted packets;

encrypt the packet location table; and store the encrypted packet location table within the nonvolatile storage as part of the partially encrypted, compressed, packetized media file, at a beginning of the partially encrypted, compressed, packetized media file such that a decryption process of the packetized media file begins with decrypting the encrypted packet location table first.

9. The apparatus of claim 8, wherein the circuitry additionally:

encrypts one or more metadata fields that bound the packets within the compressed, packetized media file; and stores the encrypted metadata fields within the nonvolatile storage as part of the partially encrypted, compressed, packetized media file.

10. The apparatus of claim 8, wherein the circuitry additionally retrieves the partially encrypted, packetized media file from the nonvolatile storage and executes a playback of media data within the unencrypted payload fields thereof.

11. The apparatus of claim 8, wherein the circuitry additionally:

retrieves the encrypted packet location table from the nonvolatile storage;

decrypts the packet location table so as to yield the locations of the encrypted header fields and side-information fields from the nonvolatile storage;

retrieves the encrypted header fields and side-information fields from the nonvolatile storage;

retrieves the unencrypted payload fields from the nonvolatile storage;

decrypts the encrypted header fields and side-information fields to yield decrypted header fields and side-information fields; and executes a playback of media data within the unencrypted payload fields based on information within decrypted header fields and side-information fields.

12. The apparatus of claim 8, wherein the circuitry that executes a playback of media data within the unencrypted payload fields comprises transducer circuitry to generate at least one of a user-perceptible audio output or a user-perceptible video output.

13. The apparatus of claim 8, wherein the circuitry to encrypt the packet location table, the header fields and side-information fields and to store the encrypted packet location table, header fields and side-information fields comprises one or more programmed processors.

* * * * *